Figure 1:
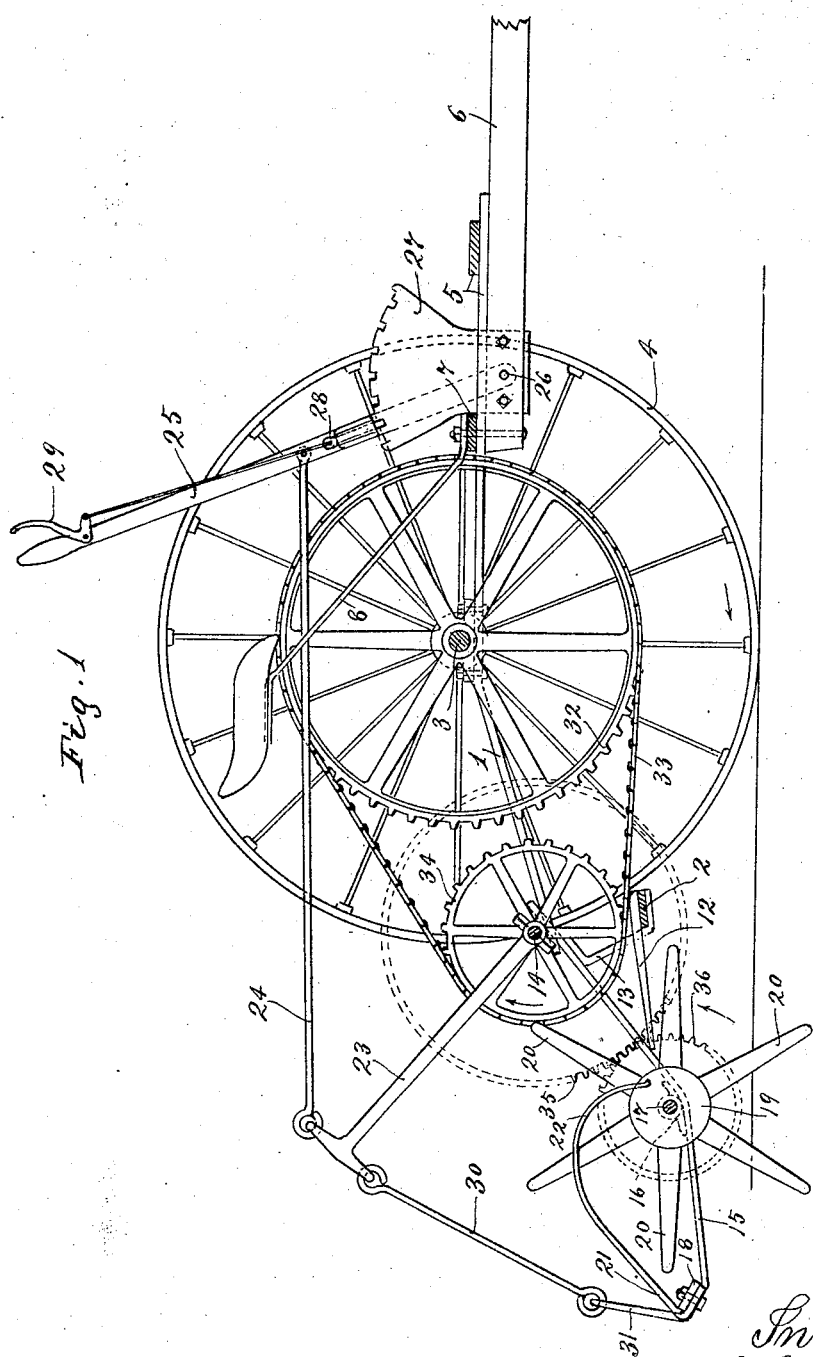

July 6, 1926.

A. G. SCHENDEL 1,591,187

SOIL PULVERIZER

Filed April 26, 1923

2 Sheets-Sheet 1

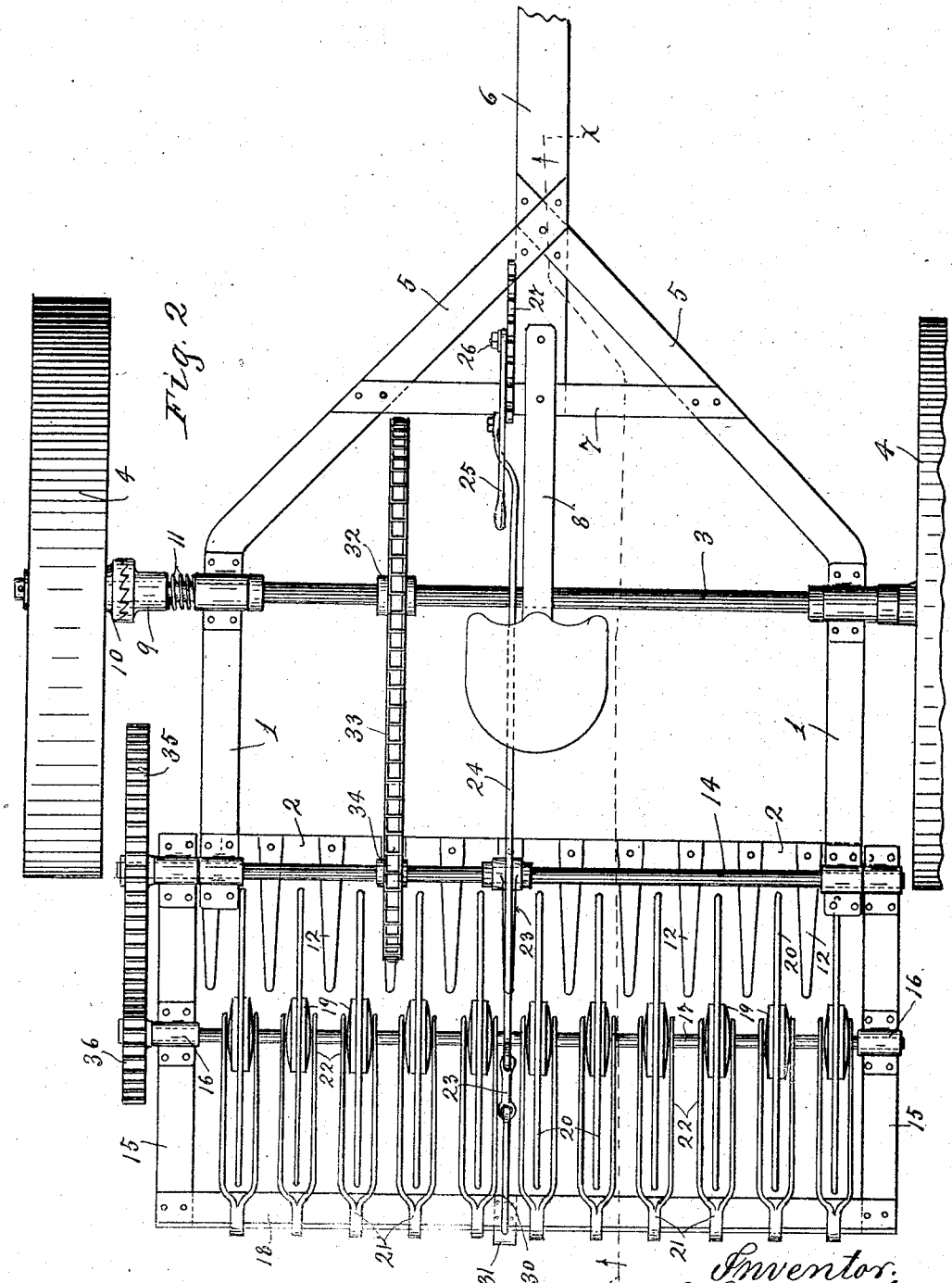

Patented July 6, 1926.

1,591,187

UNITED STATES PATENT OFFICE.

AUGUST G. SCHENDEL, OF TRIUMPH, MINNESOTA.

SOIL PULVERIZER.

Application filed April 26, 1923. Serial No. 634,650.

This invention relates to a soil pulverizer and quack grass exterminator. Quack grass has become so prolific in the Northwest and other portions of this country that considerable land has been rendered unfit for cultivation by its presence. It has been ascertained that this grass can only be destroyed by treating the soil so that the same is finely broken up and the roots of the grass lifted and brought to the surface of the ground where they can be acted upon by the hot sun.

It is an object of this invention, therefore, to provide a very simple and efficient machine, by means of which the soil can be pulverized and the quack grass and roots torn up and disposed on the surface of the ground.

It is a further object of the invention to provide such a device comprising a rotating toothed cylinder or a rotating shaft having thereon a plurality of toothed wheels, the teeth of which are adapted to pass into the ground under rotation of the wheels.

It is a further object of the invention to provide such a series of toothed wheels or toothed cylinder in combination with a series of stationary spaced teeth between which the teeth of the wheels, respectively revolve.

It is still another object of the invention to provide means for driving the toothed wheels or cylinder from the axle of the machine and to mount the same in a swinging frame which can be raised and held in various positions of elevation.

These and other objects and advantages of the invention will be fully set forth in the following description made in connection with the accompanying drawings in which like reference characters refer to the same parts throughout the different views, and in which:—

Fig. 1 is a view in side elevation of the machine, several parts being shown in vertical section; and Fig. 2 is a plan view of the machine.

Referring to the drawings, the machine comprises a frame which, as illustrated, is formed of longitudinal parallel members 1 having a transverse bar or member 2 secured thereto at the rear thereof, which members carry and are supported by an axle 3 having journaled thereon the supporting wheels 4. At the front of the axle the members 1 have converging portions 5 which are shown as overlapped at their front ends and secured to a tongue member 6. The rear of the tongue member 6 is connected to a cross member 7 also secured at its ends to the members 5 and a seat carrying bar 8 is secured at its lower end to the tongue and the bar 7 and extends upwardly and rearwardly therefrom. The wheels 4 preferably will be journaled on the axle 3 and one of the wheels 4 will have its hub provided with a clutch member 10 adapted to be engaged with a sliding clutch member 9 secured to the axle and normally held in engagement with the clutch member 10 formed on the hub of the wheel. The clutch is illustrated as being normally held in engaging position by a spring 11 and means, not shown, may be provided of any ordinary type for withdrawing the clutch 9 when desired. The rear bar 2 of the frame has projecting rearwardly therefrom a series of spaced pointed teeth 12 and said bar has secured at its ends upwardly extending brackets 13 having bearings at their upper ends supporting a shaft 14 extending transversely of the frame above the bar 2. Rearwardly extending bars 15 have bearings at their forward ends pivotally embracing the shaft 14, which bearings are preferably formed as cap bearings. These rearwardly extending bars 15 also have bearing brackets 16 secured thereto intermediate their ends in which is journaled a shaft 17 extending transversely between the members 15. The members 15 are also connected at their rear ends by a transversely extending bar 18 so that they constitute therewith a swinging frame which is movable about the shaft 14. The shaft 17 has secured thereto a series of toothed wheels comprising the hub members 19 and the spaced radially extending pointed teeth 20, which teeth are disposed to aline centrally with the spaces between the teeth 12. The bar 18 has bolted thereto a series of members 21 which extend upwardly and forwardly in an inclined direction from said bar and are forked or bifurcated to provide spaced resilient arms 22 which are curved with the convex side upwardly and extending adjacent each side of the teeth 20 and to a point somewhat in front of the shaft 17, as clearly shown in Fig. 1. The shaft 14 has secured thereto at an intermediate point, an upwardly and rearwardly extending arm 23 having a transverse arm at its top portion having an eyelet at each end to the upper one of which is connected a link 24 extending forwardly and connected to the intermediate portion of a hand lever 25 pivoted at 26 to a toothed quadrant 27 with which a pawl 28 operated by the usual grip handle 29 co-operates. The lower end of the transverse arm on members 23 is connected by a link 30 to an upwardly extending arm 31 secured to the bar 18. It will thus be seen that by swinging movement and adjustment of the lever 25, the frame comprising members 15 and 18, together with shaft 17 and wheels 19 may be elevated to different positions and held at any desired elevation.

The axle 3 is provided with a sprocket wheel 32 over which runs a chain 33 also traveling over a sprocket wheel 34 secured to shaft 14. The shaft 14 has secured at one end thereof a spur gear 35 meshing with a smaller spur gear 36 secured to the end of shaft 17. When the machine is progressed therein the wheels comprising members 19 and 20 will be rotated and the teeth thereof will pass between the teeth 12, the direction of rotation being as indicated by the arrows in Fig. 1.

In operation, the machine will be drawn along the ground and the toothed wheels on shaft 17 lowered to the desired point. As these wheels are driven they will pass into the soil and move therethrough in a forward direction. The soil will be broken up and pulverized and the quack grass and the roots thereof will be torn loose and lifted. As the wheels pass upwardly, the quack grass lifted thereby will be broken up and torn by the teeth passing through or between the teeth 12 and any clumps of dirt adhering to the roots will be further pulverized and separated from the roots. As the teeth pass upwardly and again start in a downward direction, any grass still adhering thereto or carried thereby will be stripped therefrom by the curved members 21 and will slide down said members and drop on the surface of the ground at the rear of the machine. The soil is thus finely broken up by the machine and the quack grass effectively separated therefrom and disposed on the ground. By this means, the quack grass will be exposed to the rays of the sun and effectively killed. The co-action of the teeth 20 with the teeth 12 is very effective in separating and breaking up the clumps of the grass and the roots thereof. As above stated, this loosening of the ground and tearing up of the roots and clumps of the quack grass and depositing the same on the ground has been found to be the only effective way of destroying this plant. As the bar 18 is mounted to be held but a short distance from the ground, it can be seen that the same will act to break up upwardly projecting clods in the path thereof, as the machine is moved.

When it is desired to transport the machine without the toothed wheels being in operation, the lever 25 may be swung forwardly and the swinging frame comprising members 15 and 18 lifted with the toothed wheels so that the same will be located above the ground. The machine can then be progressed without operating the toothed wheels and at this time the clutch 9 will preferably be withdrawn from engagement.

From the above description it is seen that applicant has provided a very simple and efficient machine for treating the soil and eliminating quack grass and other undesirable plants such as various varieties of thistles, wire grass, etc. The parts of the machine are comparatively few and can be easily and ruggedly made so that the machine is very durable. The machine has been demonstrated in actual practice and found very efficient for the purpose intended.

It will, of course, be understood, that various changes may be made in the form, details, arrangement and proportions of the parts without departing from the scope of applicant's invention, which, generally stated, consists in a machine capable of carrying out the objects above enumerated, and in the structure shown and described and as set forth in the appended claims.

What is claimed is:—

1. A soil pulverizer and quack grass exterminator comprising a frame, an axle supporting the same, supporting wheels for said axle, a connection from one of said wheels to said axle for driving said axle a bar extending transversely at the rear of said frame below said axle, spaced pointed teeth projecting rearwardly from said bar, a shaft extending across the rear of said frame above said bar, a swinging adjustable frame pivoted on said shaft, means for rotating said shaft from said axle, a shaft extending transversely of said swinging frame and journaled therein, a series of spaced toothed wheels secured to said last mentioned shaft having their teeth passing respectively between said spaced teeth, and means connecting said shafts for driving the latter in a direction opposite to the rotation of said first mentioned wheels.

2. The structure set forth in claim 1, a bar extending across said swinging frame in the rear of said toothed wheels, and a pair of curved spring arms having convex surfaces disposed upwardly secured to said bar in the rear of each toothed wheel, said arms extending along the sides of said wheel.

3. A quack grass exterminator and soil pulverizer comprising a frame, an axle journaled therein, ground-engaging wheels on said axle, a second frame connected to said first frame, a shaft journaled in said second frame, spaced toothed wheels carried on said shaft, means for rotating said shaft in a direction opposite from said ground-engaging wheels as the same are rotated, a plurality of teeth spaced intermediately between said toothed wheels adapted to strike off and pulverize the soil dug up by said toothed wheels on the upward movement of the same as the same are rotated, and a plurality of spaced pronged teeth at either side of said toothed wheels and adjacent thereto adapted to clear roots from said toothed wheels as the same are rotated and dispose the roots on the ground.

4. The structure defined in claim 3, said frames being pivotally connected, an arm extending upwardly and rearwardly from said first frame, means running from said second frame to said arm, and means for raising or lowering said arm to hold said second frame in various adjusted positions.

In testimony whereof I affix my signature.

AUGUST G. SCHENDEL.